US012088826B2

(12) United States Patent
Amini et al.

(10) Patent No.: US 12,088,826 B2
(45) Date of Patent: Sep. 10, 2024

(54) MULTI-SENSOR MOTION DETECTION

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 18/149,446

(22) Filed: Jan. 3, 2023

(65) Prior Publication Data
US 2023/0146916 A1 May 11, 2023

Related U.S. Application Data

(63) Continuation of application No. 17/379,513, filed on Jul. 19, 2021, now Pat. No. 11,575,912, which is a
(Continued)

(51) Int. Cl.
*H04N 19/166* (2014.01)
*G06F 9/54* (2006.01)
(Continued)

(52) U.S. Cl.
CPC .......... *H04N 19/166* (2014.11); *G06F 9/542* (2013.01); *G06T 7/20* (2013.01); *G06V 20/52* (2022.01); *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/19656* (2013.01); *G08B 13/1966* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01);
(Continued)

(58) Field of Classification Search
None
See application file for complete search history.

(56) References Cited

U.S. PATENT DOCUMENTS 7,539,489 B1  5/2009  Alexander
8,855,035 B2  10/2014 Lemoine et al.
(Continued)

FOREIGN PATENT DOCUMENTS

CN  106534634 A  3/2017
CN  106954026 A  7/2017
(Continued)

OTHER PUBLICATIONS

"Amazon Kinesis Video Streams Developer Guide", Amazon Web Services, Inc., 2018, 136 pp.
(Continued)

*Primary Examiner* — An T Nguyen
(74) *Attorney, Agent, or Firm* — Perkins Coie LLP

(57) ABSTRACT

Use of multiple sensors to determine whether motion of an object is occurring in an area is described. In one aspect, an infrared (IR) sensor can be supplemented with a radar sensor to determine whether the determined motion of an object is not a false positive.

16 Claims, 5 Drawing Sheets

Related U.S. Application Data continuation of application No. 16/000,743, filed on Jun. 5, 2018, now Pat. No. 11,102,492.

(60) Provisional application No. 62/633,017, filed on Feb. 20, 2018.

(51) Int. Cl.

| | | |
|---|---|---|
| *G06T 7/20* | (2017.01) | |
| *G06V 20/52* | (2022.01) | |
| *G07C 9/37* | (2020.01) | |
| *G08B 3/10* | (2006.01) | |
| *G08B 5/22* | (2006.01) | |
| *G08B 13/191* | (2006.01) | |
| *G08B 13/193* | (2006.01) | |
| *G08B 13/196* | (2006.01) | |
| *G08B 21/18* | (2006.01) | |
| *G08B 27/00* | (2006.01) | |
| *G08B 29/18* | (2006.01) | |
| *H04B 17/318* | (2015.01) | |
| *H04B 17/391* | (2015.01) | |
| *H04L 1/00* | (2006.01) | |
| *H04L 5/00* | (2006.01) | |
| *H04L 43/0852* | (2022.01) | |
| *H04L 43/12* | (2022.01) | |
| *H04L 43/16* | (2022.01) | |
| *H04L 65/612* | (2022.01) | |
| *H04L 65/65* | (2022.01) | |
| *H04L 65/80* | (2022.01) | |
| *H04L 67/1087* | (2022.01) | |
| *H04N 7/12* | (2006.01) | |
| *H04N 7/18* | (2006.01) | |
| *H04N 17/00* | (2006.01) | |
| *H04N 19/103* | (2014.01) | |
| *H04N 19/124* | (2014.01) | |
| *H04N 19/156* | (2014.01) | |
| *H04N 19/184* | (2014.01) | |
| *H04N 19/40* | (2014.01) | |
| *H04N 19/42* | (2014.01) | |
| *H04N 23/60* | (2023.01) | |
| *H04N 23/661* | (2023.01) | |
| *H04N 23/68* | (2023.01) | |
| *H04N 23/90* | (2023.01) | |
| *H04W 24/08* | (2009.01) | |
| *H04W 24/10* | (2009.01) | |
| *H04W 28/02* | (2009.01) | |
| *H04W 36/00* | (2009.01) | |
| *H04W 36/30* | (2009.01) | |
| *H04W 52/02* | (2009.01) | |
| *H04W 72/0453* | (2023.01) | |
| *H04W 72/23* | (2023.01) | |
| *H05B 47/105* | (2020.01) | |
| *H05B 47/19* | (2020.01) | |
| *H04N 7/14* | (2006.01) | |
| *H04N 19/00* | (2014.01) | |

(52) U.S. Cl.
CPC .......... *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/661* (2023.01); *H04N 23/665* (2023.01); *H04N 23/6811* (2023.01); *H04N 23/90* (2023.01); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/0453* (2013.01); *H04W 72/23* (2023.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | |
|---|---|---|
| 9,179,495 B1 | 11/2015 | Scherzer et al. |
| 9,451,484 B2 | 9/2016 | Boulton |
| 9,712,814 B2 | 7/2017 | Tanaka et al. |
| 9,906,722 B1 | 2/2018 | Gibot |
| 9,996,750 B2 | 6/2018 | Campbell |
| 10,033,436 B2 | 7/2018 | Thubert et al. |
| 10,044,104 B1 | 8/2018 | Bartko et al. |
| 10,177,965 B1 | 1/2019 | Joshi et al. |
| 10,425,638 B2 | 9/2019 | Yu et al. |
| 10,643,412 B1 | 5/2020 | Yang |
| 10,986,717 B1 | 4/2021 | Fu |
| 11,232,688 B1 | 1/2022 | Lemberger |
| 2002/0059627 A1 | 5/2002 | Islam et al. |
| 2002/0105921 A1 | 8/2002 | Sawyer et al. |
| 2002/0181637 A1 | 12/2002 | Nakabayashi |
| 2003/0055908 A1 | 3/2003 | Brown et al. |
| 2003/0063277 A1 | 4/2003 | Kennedy et al. |
| 2003/0193525 A1 | 10/2003 | Nygaard |
| 2005/0086569 A1 | 4/2005 | Hiddink et al. |
| 2005/0169209 A1 | 8/2005 | Miu et al. |
| 2006/0232673 A1 | 10/2006 | Lipton |
| 2007/0153916 A1 | 7/2007 | Demircin et al. |
| 2008/0020746 A1 | 1/2008 | Alexandar et al. |
| 2008/0025378 A1 | 1/2008 | Mahany et al. |
| 2008/0026748 A1 | 1/2008 | Alexander et al. |
| 2008/0112315 A1 | 5/2008 | Hu et al. |
| 2009/0022222 A1 | 1/2009 | He et al. |
| 2009/0273679 A1 | 11/2009 | Gere et al. |
| 2009/0290019 A1 | 11/2009 | Mcnelis et al. |
| 2010/0080205 A1 | 4/2010 | Hirsch et al. |
| 2010/0097472 A1 | 4/2010 | Chathukutty et al. |
| 2010/0109934 A1 | 5/2010 | Drake et al. |
| 2010/0285753 A1 | 11/2010 | Foegelle |
| 2012/0314875 A1 | 12/2012 | Lee et al. |
| 2013/0021912 A1 | 1/2013 | Finlow-bates et al. |
| 2013/0053653 A1 | 2/2013 | Cuddihy et al. |
| 2013/0089039 A1 | 4/2013 | Vashi et al. |
| 2013/0128947 A1 | 5/2013 | Fryer et al. |
| 2014/0036993 A1 | 2/2014 | Bae |
| 2014/0051379 A1 | 2/2014 | Ganesh et al. |
| 2014/0064120 A1 | 3/2014 | Sethuraman et al. |
| 2014/0092755 A1 | 4/2014 | Van De Ven et al. |
| 2014/0115114 A1 | 4/2014 | Garmark et al. |
| 2014/0169195 A1 | 6/2014 | Hsin et al. |
| 2014/0169509 A1 | 6/2014 | Tsofe |
| 2014/0240491 A1 | 8/2014 | Kauniskangas et al. |
| 2014/0269655 A1 | 9/2014 | Du et al. |
| 2014/0307707 A1 | 10/2014 | Mestanov et al. |
| 2014/0358592 A1 | 12/2014 | Wedig et al. |
| 2014/0368601 A1 | 12/2014 | DeCharms |
| 2015/0185857 A1 | 7/2015 | Jung |
| 2015/0229426 A1 | 8/2015 | Yu et al. |
| 2015/0312572 A1 | 10/2015 | Owen |
| 2015/0319411 A1 | 11/2015 | Kasmir et al. |

(56) References Cited

U.S. PATENT DOCUMENTS

| | | |
|---|---|---|
| 2015/0349859 A1 | 12/2015 | Emmanuel et al. |
| 2015/0381310 A1 | 12/2015 | Hammarwall et al. |
| 2016/0105644 A1* | 4/2016 | Smith .............. G08B 13/19667 348/159 |
| 2016/0114887 A1 | 4/2016 | Zhou et al. |
| 2016/0125714 A1 | 5/2016 | Kates et al. |
| 2016/0165620 A1 | 6/2016 | Dagen et al. |
| 2016/0278104 A1 | 9/2016 | Hiremath et al. |
| 2016/0337243 A1 | 11/2016 | Cui et al. |
| 2016/0366702 A1 | 12/2016 | Baba et al. |
| 2017/0055179 A1 | 2/2017 | Radunovic et al. |
| 2017/0070732 A1 | 3/2017 | Roulet et al. |
| 2017/0078242 A1 | 3/2017 | Nakamura et al. |
| 2017/0123058 A1 | 5/2017 | Yavari |
| 2017/0162225 A1 | 6/2017 | Jeong |
| 2017/0163944 A1 | 6/2017 | Jeong |
| 2017/0180442 A1 | 6/2017 | Lawrence |
| 2017/0237673 A1 | 8/2017 | Law |
| 2017/0242129 A1 | 8/2017 | Kallankari et al. |
| 2017/0244712 A1 | 8/2017 | Meredith et al. |
| 2017/0301201 A1 | 10/2017 | Siann et al. |
| 2017/0301203 A1 | 10/2017 | Matsuura |
| 2018/0306904 A1 | 10/2018 | Vacanti |
| 2018/0308328 A1 | 10/2018 | Siminoff |
| 2018/0357870 A1 | 12/2018 | Siminoff |
| 2018/0375594 A1 | 12/2018 | Kildal et al. |
| 2019/0014388 A1 | 1/2019 | Rutledge et al. |
| 2019/0020827 A1 | 1/2019 | Siminoff |
| 2019/0132371 A1 | 5/2019 | Bhat et al. |
| 2019/0162769 A1 | 5/2019 | Zhao et al. |
| 2019/0174330 A1* | 6/2019 | Wen ....................... H04W 24/02 |
| 2019/0200013 A1 | 6/2019 | Wu et al. |
| 2019/0202657 A1 | 7/2019 | Li et al. |
| 2019/0222897 A1 | 7/2019 | Frusina et al. |
| 2019/0261370 A1 | 8/2019 | Amini et al. |
| 2019/0282897 A1 | 9/2019 | Posin |
| 2019/0364505 A1 | 11/2019 | Wang et al. |

FOREIGN PATENT DOCUMENTS

| | | |
|---|---|---|
| CN | 110177393 A | 8/2019 |
| CN | 110177835 A | 8/2019 |
| JP | 2010232819 A | 10/2010 |
| WO | 2006075052 A1 | 7/2006 |
| WO | 2007047419 A2 | 4/2007 |
| WO | 2009048660 A2 | 4/2009 |
| WO | 2014144628 A2 | 9/2014 |

OTHER PUBLICATIONS

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

* cited by examiner

MULTI-SENSOR MOTION DETECTION

CROSS-REFERENCE TO RELATED APPLICATION(S)

This application is a continuation of U.S. patent application Ser. No. 17/379,513, entitled "Multi-Sensor Motion Detection," and filed on Jul. 19, 2021, which is a continuation of U.S. patent application Ser. No. 16/000,743, entitled "Multi-Sensor Motion Detection," and filed on Jun. 5, 2018 (now U.S. Pat. No. 11,102,492), which claims priority to U.S. Provisional Patent Application No. 62/633,017, entitled "Optimization and Testing of Wireless Devices," and filed on Feb. 20, 2018, all of which are incorporated herein by reference in their entireties.

TECHNICAL FIELD

The disclosure relates to motion detection, and in particular motion detection using different types of sensors.

BACKGROUND

Cameras for home or business security uses can include an infrared (IR) sensor and an image sensor such as a complementary metal-oxide-semiconductor (CMOS) image sensor (or charge-coupled device (CCD) image sensor). The IR sensor can be used to detect motion in an infrared portion of the electromagnetic spectrum, for example, wavelengths of 700 nanometers (nm) to 1 millimeter (mm). If motion is detected using the IR sensor, then the IR sensor can provide a signal to a microcontroller which, upon receiving the signal, can turn on the image sensor and other components of the camera such that video in the visible light portion of the electromagnetic spectrum, for example, wavelengths of 400 nm to 700 nm, can be recorded using the CMOS image sensor.

Many of cameras are often battery-powered to provide easy installation for users. However, if the IR sensor provides a false positive motion detection, the other components of the camera can be turned on to begin the video recording process. The resulting video would show nothing of interest to the user and, therefore, the camera unnecessarily drained some of its battery. Moreover, the user might be notified of the detected motion, for example, via a message delivered to a smartphone. The user might then want to watch the video and find that there is nothing of interest due to the false positive. Thus, the user experience can be degraded.

SUMMARY

Some of the subject matter described herein includes a method including: determining, by a processor, a first indication of a motion of a first object in an area based on a first sensor that is responsive to wavelengths in a first, non-visible light region of an electromagnetic spectrum; receiving first video data depicting the motion of the first object in the area as recorded by an image sensor that is responsive to wavelengths in a visible light portion of the electromagnetic spectrum; determining, by the processor, a second indication of the motion of the first object in the area based on a second sensor that is responsive to wavelengths in a second, non-visible light region of the electromagnetic spectrum; determining, by the processor, with both of the first indication of the motion and the second indication of the motion that the motion of the object is not a false positive determination of motion in the area; and providing the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the method includes adjusting motion detection thresholds used by the camera to determine motion of objects in the area, the motion detection thresholds related to characteristics of the motion that are considered in a determination that motion is occurring in the area.

In some implementations, the method includes: determining, by the processor, a second indication of motion of a second object in the area based on the first sensor; receiving second video data depicting the motion of the second object in the area; determining, by the processor, that the second sensor did not provide an indication of the second object in the area; determining, by the processor, that the second indication of the motion of the second object is a false positive determination of motion based on the second sensor not providing the indication of the motion of the second object in the area; and refraining from providing the second vide data to the cloud server based on the determination of the motion of the second object being a false positive determination of motion.

In some implementations, the first sensor is an infrared (IR) sensor, the method further includes adjusting motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

In some implementations, the second sensor is a radar sensor.

Some of the subject matter described herein also includes an electronic device, including: one or more processors; and memory storing instructions, wherein the processor is configured to execute the instructions such that the processor and memory are configured to: determine a first indication of a motion of a first object in an area based on a first sensor that is responsive to wavelengths in a first, non-visible light region of an electromagnetic spectrum; receive first video data depicting the motion of the first object in the area as recorded by an image sensor that is responsive to wavelengths in a visible light portion of the electromagnetic spectrum; determine a second indication of the motion of the first object in the area based on a second sensor that is responsive to wavelengths in a second, non-visible light region of the electromagnetic spectrum; determine with both of the first indication of the motion and the second indication of the motion that the motion of the object is not a false positive determination of motion in the area; and provide the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the processor is configured to execute the instructions such that the processor and memory are configured to adjust motion detection thresholds used by the camera to determine motion of objects in the area, the motion detection thresholds related to characteristics of the motion that are considered in a determination that motion is occurring in the area.

In some implementations, the processor is configured to execute the instructions such that the processor and memory are configured to: determine a second indication of motion of a second object in the area based on the first sensor; receive second video data depicting the motion of the second object in the area; determine that the second sensor did not provide an indication of the second object in the area; determine that the second indication of the motion of the second object is a false positive determination of motion based on the second sensor not providing the indication of the motion of the second object in the area; and refrain from providing the second vide data to the cloud server based on the determination of the motion of the second object being a false positive determination of motion.

In some implementations, the first sensor is an infrared (IR) sensor, and the processor is configured to execute the instructions such that the processor and memory are configured to adjust motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

In some implementations, the second sensor is a radar sensor.

Some of the subject matter described herein also includes a computer program product including one or more non-transitory computer-readable media storing computer program instructions, execution of which by a processing system causes the processing system to perform operations including: determine a first indication of a motion of a first object in an area based on a first sensor that is responsive to wavelengths in infrared first, non-visible light region of an electromagnetic spectrum; receive first video data depicting the motion of the first object in the area as recorded by an image sensor that is responsive to wavelengths in a visible light portion of the electromagnetic spectrum; determine a second indication of the motion of the first object in the area based on a second sensor that is responsive to wavelengths in a second, non-visible light region of the electromagnetic spectrum; determine with both of the first indication of the motion and the second indication of the motion that the motion of the object is not a false positive determination of motion in the area; and provide the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the execution of the computer program instructions causes the processing system to perform operations comprising adjust motion detection thresholds used by the camera to determine motion of objects in the area, the motion detection thresholds related to characteristics of the motion that are considered in a determination that motion is occurring in the area.

In some implementations, the execution of the computer program instructions causes the processing system to perform operations includes: determine a second indication of motion of a second object in the area based on the first sensor; receive second video data depicting the motion of the second object in the area; determine that the second sensor did not provide an indication of the second object in the area; determine that the second indication of the motion of the second object is a false positive determination of motion based on the second sensor not providing the indication of the motion of the second object in the area; and refrain from providing the second vide data to the cloud server based on the determination of the motion of the second object being a false positive determination of motion.

In some implementations, the first sensor is an infrared (IR) sensor, and wherein the execution of the computer program instructions causes the processing system to perform operations including adjust motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

DETAILED DESCRIPTION

Figure 1:
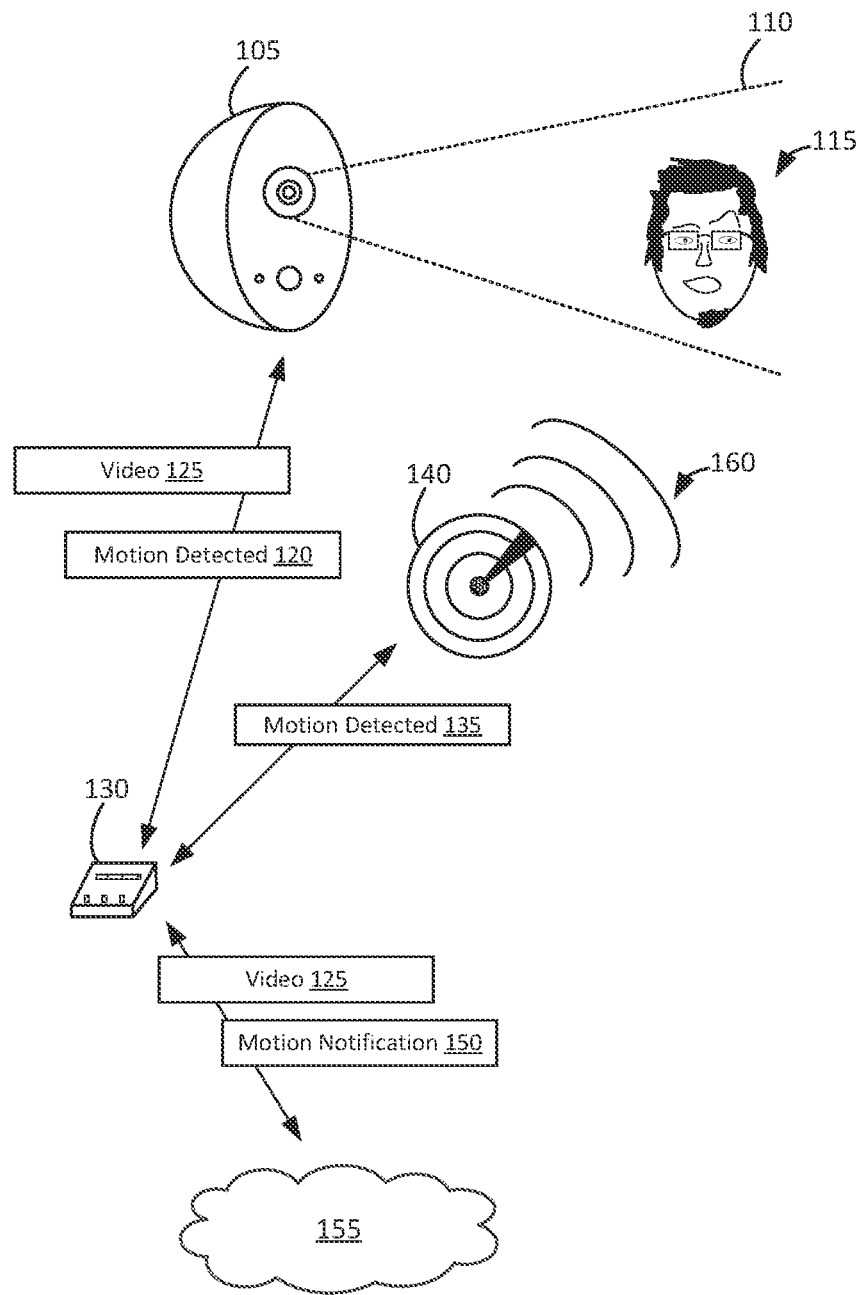
FIG. 1 illustrates an example of multi-sensor motion detection.

This disclosure describes techniques for using multiple sensors for motion detection. In one example, a camera can include an IR sensor that can be used to detect motion by determining the motion of heat in the infrared portion of the electromagnetic spectrum. Upon detection of motion, the IR sensor can send a signal to a microcontroller. The microcontroller can then turn on other components of the camera, for example, a CMOS image sensor to begin recording in the visible light portion of the electromagnetic spectrum to generate a video depicting the object producing the motion as it is within the field of view of the camera. The microcontroller can also turn on a wireless device (e.g., an Institute of Electrical and Electronics Engineers (IEEE) 802.11 wireless communications semiconductor circuit) to allow for the recorded video to be uploaded to a base station and then uploaded by the base station to a cloud server for viewing by the user. The cloud server can also notify the user via a message to the user's smartphone that motion was detected in the field of vision of the camera and the video produced by the image sensor of the camera is available for viewing.

A supplemental sensor can work in conjunction (e.g., at a similar or simultaneous time) with the IR sensor of the camera to detect motion via another technique. For example, a radar sensor can be used to determine whether motion is detected in the field of vision of the camera by generating electromagnetic waves in the radio spectrum (e.g., 3 hertz (Hz) to 3 terahertz (THz)) or the microwave spectrum (e.g., 300 megahertz (MHz) to 300 gigahertz (GHz)) and detecting the reflections of those electromagnetic waves off objects. A base station can then determine whether both the IR sensor and the radar sensor detected motion in the same area. If so, then this can be a positive determination of motion detection. The base station can then provide the recorded video to a cloud server for the user to view later, or provide a notification to the cloud server that motion was detected. This can allow for the user to be notified that motion was detected and the user can then decide whether to watch the video.

By using multiple and different types of sensors to detect motion, the number of false positives can be reduced. For example, if the IR sensor indicates that motion is detected but the radar sensor does not indicate that motion is detected, then this can be determined by the base station to be a false positive (i.e., there is no motion, or the motion is not important or relevant enough to alert a user). This can result in the base station to not upload the video to the cloud server, resulting in reduced bandwidth usage, reduced storage of videos at the cloud server, and reduced notifications to the user of motion detections that ended up being false positives. These can improve the user experience of the camera.

The base station can also adjust the sensitivity of the sensors to motion. For example, if the IR sensor in the above example provided a false positive, then information that it uses to detect motion can be changed. For example, a motion detection threshold can be adjusted such that the IR sensor is less sensitive to motion. Thus, characteristics of motion, such as trajectory of that motion within the field of vision (e.g., an object has to move at a higher speed to be determined to be positive determination of motion), areas within the field of vision for motion to be detected (e.g., motion should be within eight feet of the IR sensor to trigger a motion determination that is relevant to the user while motion more than eight feet away can be determined to be irrelevant), or different types of motion (e.g., objects moving in a straight line might be determined to not be relevant motion) might be considered differently by the camera and used to trigger the IR sensor to indicate that motion has been detected. However, the characteristics of motion that previously provided the false positive can no longer cause the IR sensor to determine that motion occurred in its field of vision. This can also improve the user experience as described above. Additionally, this can improve the user experience by having the motion detection be adjusted over time. This can then consider changes in the environment of the sensors, for example, new next-door neighbors, more street traffic, more vegetation growth, etc. that can be accounted for to reduce the number of false positives.

Similarly, the number of false negatives can be reduced. For example, if the IR sensor detects motion but the radar sensor does not detect motion, and if the video is analyzed to determine that there was motion that is of interest to the user, then the radar sensor's sensitivity can be adjusted to be more sensitive. This can also improve the user experience.

In more detail, FIG. 1 illustrates an example of multi-sensor motion detection. In FIG. 1, camera 105 includes field of vision 110 in which movement can be detected and if detected, video data can be generated to produce a video to play back what occurred within field of vision 110. For example, as previously discussed, camera 105 can include an IR sensor to determine motion and a CMOS image sensor that can be turned on to record video if the IR sensor detects motion within field of vision 110. In FIG. 1, this results in information or data such as motion detected 120 being provided to base station 130, which can provide an indication that motion was detected within field of vision 110 (e.g., the movement of intruder 115). Alternatively, or additionally, video 125 (e.g., video data including image frames depicting the movement of intruder 115 within field of vision 110) can be generated by camera 105 using the image sensor and then provided to base station 130. For example, providing video 125 to base station 130 can also be an indication that motion was detected.

Radar sensor 140 can be a supplemental sensor for detecting motion within field of vision 110 or in the general vicinity of field of vision 110 (e.g., more area than what is covered by field of vision 110) that can serve as a type of second opinion regarding whether the movement of the object within field of vision 110 is relevant or important for the user, or even if it is real. For example, radar sensor 140 can generate electromagnetic waves 160 that can be reflected off objects within field of vision 110, including intruder 115. By analyzing these reflections, radar sensor 140 can determine that motion is occurring within field of vision 110. As a result, radar sensor 140 can provide information such as motion detected 135 to base station 130 to indicate that motion was detected via radar. Thus, both camera 105 and radar sensor 140 can determine whether motion is occurring within field of vision 110 within the same or similar time. As a result, when intruder 115 crosses into field of vision 110, both camera 105 and radar sensor 140 can alert base station of this detected movement.

In some implementations, radar sensor 140 can be integrated within base station 130, radar sensor 140 may be a stand-alone device, radar sensor 140 can be integrated within camera 105, or all of camera 105, base station 130, and radar sensor 140 can be integrated into a single device. Radar sensor 140 can determine speed, distance from radar sensor 140, direction (e.g., approaching or retreating from radar sensor 140), or other characteristics of the position, location, or movement of objects. Radar sensor 140 can be a wide band radar, ultra-wideband (UWB) radar, continuous wave frequency modulation (CWFM) radar, or other type of radar.

Base station 130 can be communicatively coupled with camera 105 and radar sensor 140 via physical wiring or wireless technologies such as IEEE 802.11, Bluetooth, etc. Base station 130 can also be communicatively coupled with cloud server 155, for example, via an Internet connection. Base station 130 can provide notifications of detected movement within field of vision 110 (e.g., the sidewalk leading up to a home's front door) to cloud server 155, for example, via motion notification 150. Upon receiving motion notification 150, cloud server 155 can generate a message delivered to the user's (e.g., homeowner) smartphone providing an indication that motion was detected in the area where the user set up camera 105 (e.g., within field of vision 110). This can allow the user to be informed of a possible security situation at home.

Base station 130 can also upload, or provide, video 125 to cloud server 155. As previously discussed, video 125 can be the result of image sensor of camera 105 being used to record the activity occurring within field of vision 110 when the IR sensor of camera 105 was used to determine that motion has been detected. Video 125 can be stored by cloud server 155 and provided to the user to view, for example, via a smartphone, web browser on a computer, etc. so that the nature of the detected motion can be determined. For example, in FIG. 1, intruder 115 moving within field of vision 110 can be viewed by the user.

In FIG. 1, because both the IR sensor of camera 105 and radar sensor 140 detected motion, motion notification 150 and video 125 are provided to cloud server 155. That is, base station 130 has determined that both the IR sensor of camera 105 and radar sensor 140 have detected motion and, therefore, cloud server 155 should be notified and/or provided video 125. However, if radar 140 does not detect motion, but the IR sensor of camera 105 does detect motion, then base station 130 might not provide video 125 or motion notification 150 to cloud server 155 because this can be an indication of a false positive regarding the motion that was determined by the IR sensor to be occurring. That is, there is actually no intruder moving within field of vision 110. Rather, some other activity, for example, an insect moving along the IR sensor of camera 105 might have triggered the IR sensor to provide a false positive. Other examples of scenarios in which the IR sensor might produce a false positive include temperature fluctuations, for example, by sunlight being incident upon the IR sensor.

In another example, radar sensor 140 can detect motion within field of vision 110, but the IR sensor of camera 105 might not detect motion and, therefore, video might not be recorded using the image sensor of camera 105. In this example, if radar sensor 140 (or another type supplemental sensor) detects motion, then this can be prioritized by base station 130 and used by base station 130 to provide data to camera 105 to begin recording. Thus, video 125 can be generated and provided to cloud server 155.

Though the example in FIG. 1 uses radar sensor 140, other types of sensors can be used. For example, as discussed later, motion can be detected using a wireless mesh network implementing an IEEE 802.11 compliant wireless network.

Figure 2:
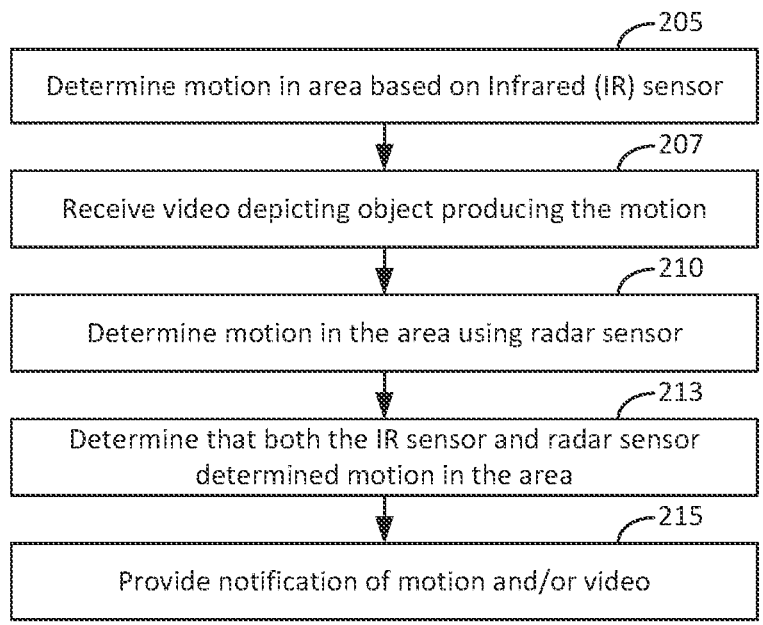
FIG. 2 illustrates an example of a block diagram for multi-sensor motion detecting using a radar sensor.

FIG. 2 illustrates an example of a block diagram for multi-sensor motion detecting using a radar sensor. In FIG. 2, motion can be determined to be occurring within an area using an IR sensor (205). For example, in FIG. 1, camera 105 can include an IR sensor to detect motion occurring within field of vision 110 (e.g., the area that the IR sensor is pointing towards). The detection of the motion can be based on the IR sensor generating a voltage in response to heat detected in its field of vision. If the source of the heat moves, this results in a change in that voltage. Accordingly, this change in voltage can be used to determine that the IR sensor has detected motion. In some implementations, the IR sensor can be a passive infrared (PIR) sensor. This detection of motion can be a first indication of motion within field of vision 110. However, as previously discussed, this first indication can be a false positive or be the result of motion that is of relatively no interest to a user and, therefore, should not be used to determine that motion has occurred.

The detection of motion can then be used to cause camera 105 to generate a video using an image sensor to visually depict that motion. Data regarding the motion and/or the video can then be provided to and received by base station 130 (207).

Motion can also be determined to be occurring within an area using a radar sensor (210). This can be a second indication of motion of the same object as a double-checking or verification of the motion determined by the IR sensor of camera 105. For example, in FIG. 1, radar sensor 140 can generate electromagnetic waves 160 and determine reflections of those waves off objects within field of vision 110 and determine whether there is movement upon an analysis of those reflections. Data regarding the motion can then be provided to and received by base station 130 as a determination of motion.

The base station can then determine that both the IR sensor and the radar senor determined that motion occurred in the same or generally same area (213). This can be an indication that the motion of the object is not a false positive and that it is likely to be of interest for a user to be alerted regarding the presence of the object within field of view 110.

A notification indicating that motion was detected and/or a video of portraying the area when the motion was detected can then be provided to a cloud server (215) such that a user can be informed of the motion. For example, in FIG. 1, video 125 and/or motion notification 150 can be provided to cloud server 155 by base station 130 if both camera 105 and radar sensor 140 provide motion detected 120 and motion detected 130, respectively, or if camera 130 provides a video. Thus, if both the IR sensor of camera 105 and radar sensor 140 detect motion within field of vision 110, video 125 can be generated by the image sensor of camera 105 and then provided to base station 130. Because radar sensor 140 also indicates that motion has occurred within field of vision 110, video 125 can then be uploaded to cloud server 155. If radar sensor 140 did not indicate that motion occurred within field of vision 110, then base station 130 might discard the video (e.g., not upload it to cloud server 155).

In some implementations, base station 130 might locally store video 125 for later viewing by the user rather than uploading to cloud server 155 if radar sensor 140 does not indicate that motion is detected. In some implementations, base station 130 might provide video 125 to cloud server 155 along with information indicating that radar sensor 140 did not detect motion (i.e., that only the IR sensor of camera 105 detected motion within field of vision 110). Cloud server 155 might then store video 125, but not provide an alert to the user as this can be a false positive. Video 125 can then be analyzed by cloud server 155 to determine why it was a false positive. In some implementations, video 125 that is related to a false positive can be stored for later viewing by the user. For example, this can represent a video of less important or relevance to the user and, therefore, a notification might not be provided but the video still available for the user in case the user would like to view the video later.

Other types of supplemental sensors other than radar 140 in FIG. 1 can be used to provide a second opinion or determination regarding the presence of motion within field of view 110. For example, characteristics of a wireless network within the property in which camera 105 and base station 130 are within can be used to determine that motion has occurred. For example, Bluetooth (e.g., implementing a personal area network (PAN)) or wifi (e.g., IEEE 802.11 implementing a wireless local area network (WLAN)) devices can be used to determine that motion has occurred.

For example, radio frequency (RF) characteristics of the wireless network can be used to determine that motion has occurred. In one example, the channel state information (CSI) in wireless communications provides channel properties of a wireless communications link, for example, between base station 130 and a wireless access point (AP). CSI can be provided by each packet as it is transmitted to or from base station 130 and an AP. The CSI can include a significant amount of information that can be analyzed by a variety of methodologies to determine that motion is occurring within the physical space that the wireless network is implemented within. For example, changes or deviations in the expected amplitude or phase of the signals as indicated in the CSI can be used to determine that motion has occurred. Thus, characteristics or changes in those characteristics of the CSI can be used to determine that motion has occurred.

Figure 3:
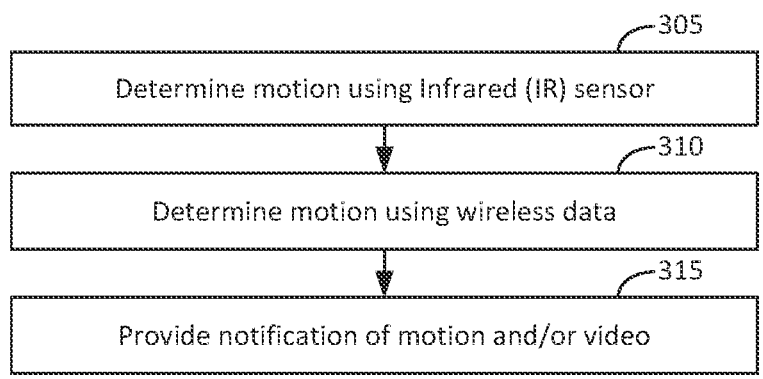
FIG. 3 illustrates an example of a block diagram for multi-sensor motion detecting using wireless data.

FIG. 3 illustrates an example of a block diagram for multi-sensor motion detecting using wireless data. In FIG. 3, motion can be determined to have occurred in an area using an IR sensor (305). Motion can also be determined using wireless data (310). For example, base station 130 can be using the same wireless network as one being provided by one or more access points. Base station 130 can receive CSI data from these other access points and based on the CSI data, base station 130 can determine that motion has occurred in the area. A notification indicating that motion was detected and/or video depicting the motion can then be provided to a cloud server (315). This can occur if base station 130 determines that motion was detected by the IR sensor of camera 105 and the CSI data.

Figure 4:
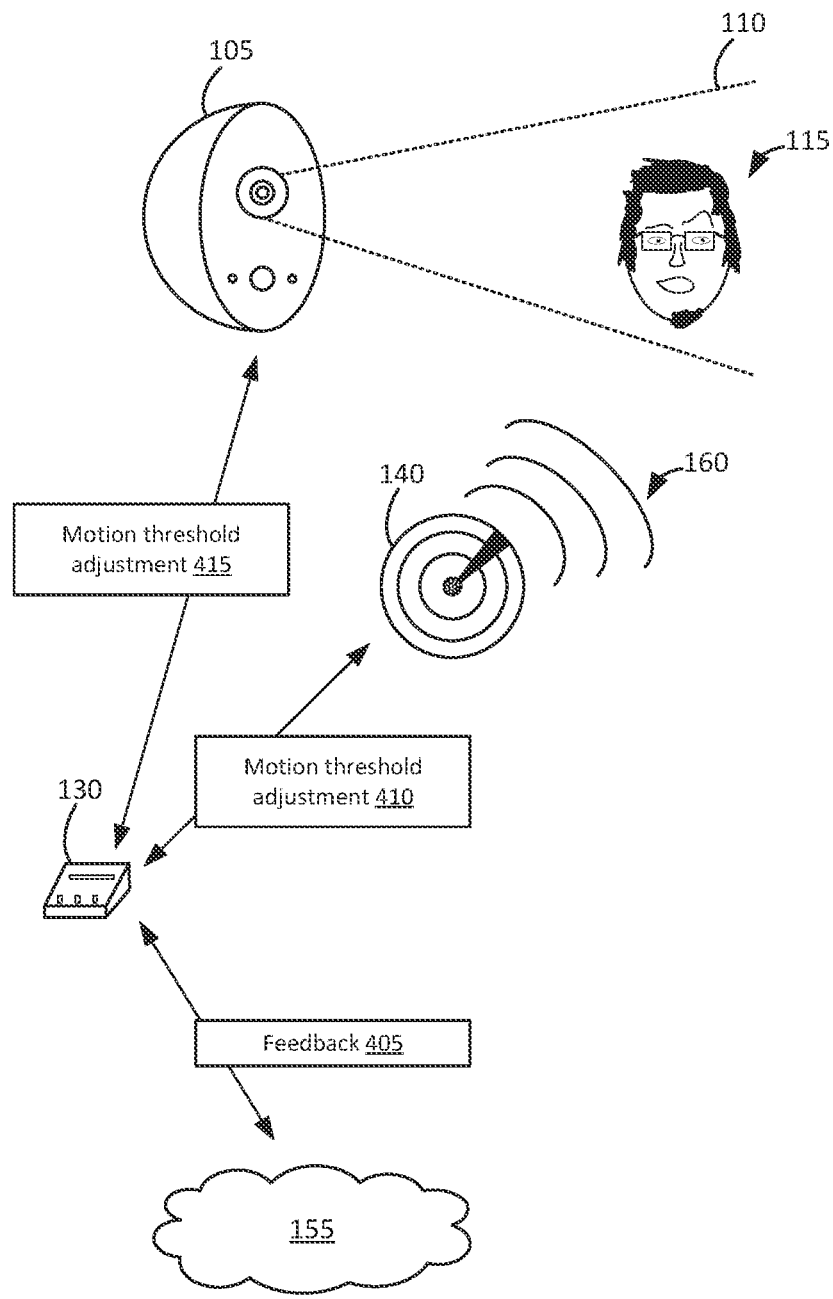
FIG. 4 illustrates an example of adjusting motion detection thresholds.

A variety of machine learning or statistical analysis can also be used to adjust the sensitivity of the sensors to motion. FIG. 4 illustrates an example of adjusting motion detection thresholds. In FIG. 4, cloud server 405 can include logic to determine whether any data or information used by camera 105 or radar sensor 140 used to detect motion should be adjusted. For example, if radar sensor 140 does not detect motion in an area that the IR sensor of camera 105 detected motion, then this discrepancy between the determinations of radar sensor 104 and camera 105 can be provided to cloud server 155. In some implementations, video 125 can also be provided. Cloud server 155 can then provide feedback 405 (e.g., based on the discrepancy, an analysis of video 125, etc.) to base station 130 which can in turn provide motion threshold adjustment 415 to camera 105. Motion threshold adjustment 415 can include information regarding changes that camera 105 should implement such that the sensitivity of its motion detection is changed. This can include changing the characteristics of the motion that are used to determine whether motion is occurring within field of vision 110. For example, if the IR sensor previously detected motion in a scenario that ended up being a false positive, then the motion determination sensitivity of camera 105 can be changed such that when the same scenario occurs, it does not indicate that meaningful motion occurred (i.e., no motion of interest to the homeowner occurred). This would result in the camera not determining that motion occurred within field of vision 110 even though before the adjustments were applied, the same type of motion would have triggered a determination that motion occurred.

In one example, this can include changing the distance from the IR sensor in which motion can be determined. Motion threshold adjustment 415 can be processed by camera 105 such that movement closer to the IR sensor would result in a motion determination while movement farther away would not result in a motion determination. In another example, the speed of motion can be adjusted such that objects would need to move faster or slower for motion to qualify as detectable motion to result in recording video or providing a notification to the user regarding the motion. In another example, the expected trajectory of the objects within field of vision 110 can be changed to change when camera 105 determines that motion has occurred. Thus, only some types of motion might be determined to be important or relevant to the user if the types of motion meets these motion thresholds.

Base station 130 can also provide motion threshold adjustment 410 to radar sensor 140 such that the motion thresholds for radar sensor 140 can also be changed in a similar manner.

Figure 5:
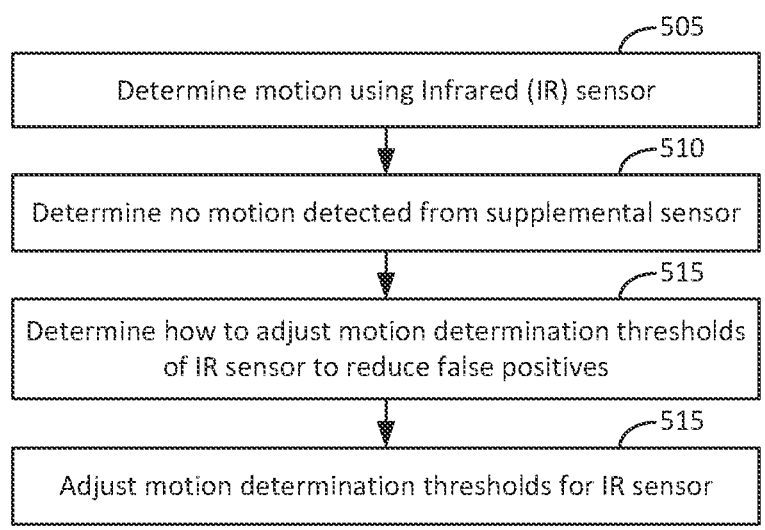
FIG. 5 illustrates an example of a block diagram for adjusting motion detection thresholds.

FIG. 5 illustrates an example of a block diagram for adjusting motion detection thresholds. In FIG. 5, motion can be determined to have occurred using an IR sensor (505). For example, motion within field of view 110 of camera 105 in FIG. 5 might occur and that motion might have characteristics resulting in a determination that motion of interest to a user is occurring within field of vision 110. This can result in base station 130 being alerted to this motion.

Next, no motion might be detected from a supplemental sensor (510). For example, radar sensor 140 in FIG. 4 might not detect motion within field of view 110. This information regarding the lack of motion can be provided to base station 130 and base station 130 can then determine that motion was determined using camera 105 but not radar sensor 140. This can be indicative of a false positive of motion detection related to camera 105.

Base station 130 can then determine how to adjust motion determination thresholds of the IR sensor to reduce false positives (515). For example, in FIG. 4, base station 130 can provide information to cloud server 155 regarding the false positive as well as the motion thresholds used by camera 105 and/or radar sensor 140 when the characteristics of motion within field of view 110 is analyzed and determined to be motion of important or relevance to the user, as previously discussed. Any generated video data can also be provided. Cloud server 155 can analyze the received information and determine how to adjust the motion determination thresholds of the IR sensor to reduce these false positives. In another implementation, base station 130 can determine how to adjust the motion determination thresholds of the IR sensor without contacting cloud server 155. Upon determining how to adjust the motion determination thresholds, base station 130 can provide motion threshold adjustment 415 to camera 105 to update its motion thresholds such that different characteristics of motion would result in different determinations regarding movement occurring within field of vision 110 in the future. For example, camera 105 might be adjusted such that fewer determinations of motion can be determined.

Camera 105 in FIG. 1 can include radar sensor 140 integrated within it. Integrating radar sensor 140 into camera 105 can result in the same power supply (e.g., battery) used to power both the IR sensor of camera 105 and radar sensor 140. However, use of radar sensor 140 might cause the battery of camera 105 to discharge quickly due to the higher power requirements to operate radar sensor 140. The IR sensor can have lower power requirements than radar sensor 140. To preserve or extend the battery life of camera 105, radar sensor 140 can be initially turned off. When the IR sensor is triggered upon motion, this can also cause radar sensor 140 to be turned on to determine whether the motion can be verified using radar. After the determination of whether there is motion or after the operation of radar sensor 140 to allow for the determination is complete, radar sensor 140 can then be turned off. Thus, radar sensor 140 can be used only at times when it is to provide a supplemental determination of an object moving.

In some implementations, radar sensor 140 of camera 105 can be periodically turned on. For example, radar sensor 140 can be turned on for five minutes, then turned off for ten minutes, and then turned on again for five minutes, and so forth.

In some implementations, camera 105 can be optionally hard wired into a home's electrical system. Thus, camera 105 in this situation would not need to use a battery to operate radar sensor 140. Camera 105 can detect whether the power supply is a battery or the electrical system (e.g., connected with the electrical grid of an interconnected network for delivering electricity). If camera 105 is using a battery, then radar sensor 140 can be turned on and off as described above (i.e., when the IR sensor is triggered). If camera 105 is determined to be on the electrical system (i.e., not dependent on the battery), then radar sensor 140 can be turned on without the need to turn it off periodically.

The operational parameters of radar sensor 140 can also be adjusted to reduce power consumption and extend the battery life of radar sensor 140 and, therefore, extend how long radar sensor 140 can operate before needing to change or recharge the battery. For example, transmission parameters related to how electromagnetic waves 160 are generated by radar sensor 140 and propagated can be adjusted. In one example, if the amount of motion detected using the IR sensor is small (e.g., a small change in voltage produced by the IR sensor), then this small amount of motion might have a higher change of being a false positive. In this case, radar sensor 140 can then be turned on to verify the results of the IR sensor. By contrast, if the amount of motion is large, then radar sensor 140 can remain off because a large amount of motion might have a lower change of being a false positive. The amount of motion can be how fast the movement is, how large the object that is moving is, direction, acceleration, or other characteristics of motion as described herein. In another example, if the amount of motion is small, then the transmission parameters related to how electromagnetic waves 160 are generated can be adjusted to be different than if the amount of motion is large. For example, the frequency or frequencies used (of electromagnetic waves 160), pulse width, amplitude, pulse repetition frequency (e.g., how often or how many pulses of electromagnetic waves 160 are emitted), or other characteristics can be changed to extend battery life in certain identified situations such as the amount of motion or movement.

Figure 6:
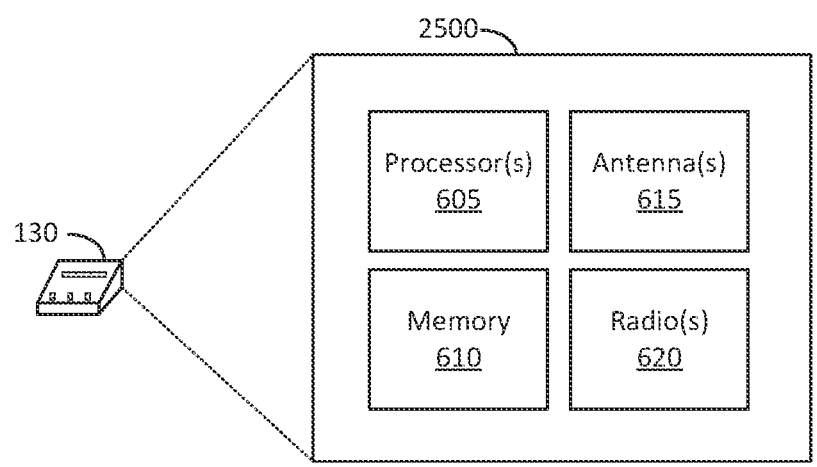
FIG. 6 illustrates an example of a simplified block diagram of an electronic device which may be used with some implementations.

FIG. 6 illustrates an example of a simplified block diagram of an electronic device which may be used with particular implementations. The electronic device of FIG. 6 can implement any of the functionalities and features discussed above, including base station 130. However, the components can also be used to implement camera 105 and radar sensor 140.

For example, FIG. 6 portrays a high-level block diagram illustrating a processing device 2500 implementing base station 130 in which at least some operations described herein can be implemented. In some implementations, the block diagram can also implement the other devices described herein, such as camera 105 and radar sensor 140. The processing system can be a system that can run any of the methods/algorithms/techniques described above.

In the illustrated embodiment, the processing device 2500 includes one or more processors 605, memory 610, antenna 615, and one or more radios 620. Processors 605 may be or include, for example, one or more general-purpose programmable microprocessors or microprocessor cores, microcontrollers, application specific integrated circuits (ASICs), programmable gate arrays, or the like, or a combination of such devices. The processor(s) 605 control the overall operation of the processing device 2500. Memory 610 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 may store data and instructions that configure the processor(s) 605 to execute operations in accordance with the techniques described above. Processing device 2500 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 2500, it can also include I/O devices that can include devices such as a display (which may be a touch screen display), audio speaker, keyboard, mouse or other pointing device, microphone, camera, etc. Processing device 2500 can also include radios 620, for example, a different radio for each band that communication links can be established within. Processing device 2500 can also include one or more antennas 615 for aiding the establishing of the communication links. For example, radio 620 can generate a signal that is transmitted via antenna 615.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 2500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A computer-implemented method comprising:
receiving, by one or more computer processors, data packets transmitted within a wireless communications link between at least one base station and at least one wireless access point (AP),
wherein the wireless communications link is implemented within a physical area;
extracting channel state information (CSI) of the wireless communications link from the data packets;
analyzing a deviation in at least one of expected amplitude or phase of signals of the wireless communications link based on the CSI;
determining an indication of motion of objects in the physical area based on analyzing the deviation in the at least one of expected amplitude or phase;
sending the indication of motion to a cloud server; and
sending a notification of the indication of motion to a user device for viewing the indication of motion, from the cloud server, on the user device, and
using machine learning to adjust a sensitivity of a sensor to the motion, wherein movement of the objects closer to the sensor results in motion determination while movement of the objects further from the sensor results in no motion determination.

2. The method of claim 1, comprising:
determining that the indication of the motion is a false positive determination based on data obtained from the sensor; and
responsive to determining that the indication of motion is a false positive determination, refrain from sending video from the sensor to a user device.

3. The method of claim 1, comprising:
adjusting motion detection thresholds of the sensor based on the indication of the motion of the objects in the physical area.

4. The method of claim 1, comprising:
receiving video data depicting the motion of the objects recorded by an image sensor that is responsive to wavelengths in a visible light portion of the electromagnetic spectrum.

5. A base station, comprising:
one or more processors; and
a computer-readable non-transitory memory storing instructions, wherein the one or more processors are configured to execute the instructions such that the base station is configured to:
receive data packets transmitted within a wireless communications link by at least one wireless access point (AP);
extract channel state information (CSI) of the wireless communications link from the data packets;
analyze a deviation in at least one of expected amplitude or phase of signals of the wireless communications link based on the CSI;
determine an indication of motion of objects based on analyzing the deviation in the at least one of expected amplitude or phase;
use machine learning to adjust a sensitivity of a sensor to the motion, wherein movement of the objects closer to the sensor results in motion determination while movement of the objects further from the sensor results in no motion determination; and
send the indication of motion to a cloud server.

6. The base station of claim 5, wherein the wireless communications link is implemented within a physical area, and
wherein the motion of the objects is in the physical area.

7. The base station of claim 5, wherein the base station is configured to:
send a notification of the indication of motion to a user device for viewing the indication of motion, from the cloud server, on the user device.

8. The base station of claim 5, configured to:
determine that the indication of motion is a false positive determination based on data obtained from the sensor; and
responsive to determining that the indication of motion is a false positive determination, refrain from sending a notification of the indication of motion to a user device.

9. The base station of claim 5, configured to:
adjust motion detection thresholds of the sensor based on the indication of the motion of the objects.

10. The base station of claim 5, configured to:
receive video data depicting the motion of the objects recorded by an image sensor that is responsive to wavelengths in a visible light portion of the electromagnetic spectrum.

11. A wireless access point (AP), comprising:
one or more processors; and a computer-readable non-transitory memory storing instructions, wherein the one or more processors are configured to execute the instructions such that the AP is configured to:
  receive data packets transmitted within a wireless communications link by a base station;
  extract channel state information (CSI) of the wireless communications link from the data packets;
  determine an indication of motion of objects from the CSI;
  use machine learning to adjust a sensitivity of a sensor to the motion, wherein movement of the objects closer to the sensor results in motion determination while movement of the objects further from the sensor results in no motion determination; and
  send the indication of motion to a cloud server.

12. The AP of claim 11, wherein the wireless communications link is implemented within a physical area, and wherein the motion of the objects is in the physical area.

13. The AP of claim 11, configured to:
  send a notification of the indication of motion to a user device for viewing the indication of motion, from the cloud server, on the user device.

14. The AP of claim 11, wherein the instructions to determine the indication of motion configure the AP to:
  analyze a deviation in at least one of expected amplitude or phase of signals of the wireless communications link based on the CSI.

15. The AP of claim 14, configured to:
  determine that the indication of motion is a false positive determination based on data obtained from the sensor; and
  responsive to determining that the indication of motion is a false positive determination, refrain from sending a notification of the indication of motion to a user device.

16. The AP of claim 11, configured to:
  adjust motion detection thresholds the of sensor based on the indication of the motion of the objects.

* * * * *